United States Patent [19]

Garney

[11] 4,425,966
[45] Jan. 17, 1984

[54] BOREHOLE CENTRALIZER WITH POSITIVELY INDEXABLE CONTACT ARMS

[75] Inventor: Tom A. Garney, Houston, Tex.

[73] Assignee: Dresser Industries, Inc., Dallas, Tex.

[21] Appl. No.: 289,002

[22] Filed: Jul. 31, 1981

[51] Int. Cl.³ .............................................. E21B 17/10
[52] U.S. Cl. ..................................... 166/241; 175/325
[58] Field of Search .................. 403/318, 356, 358; 464/157; 166/241, 113; 175/325; 33/178 F

[56] References Cited

U.S. PATENT DOCUMENTS

| 808,004 | 12/1905 | Bryant | 403/358 |
|---|---|---|---|
| 2,618,342 | 11/1952 | Meyer | 166/241 X |
| 2,719,361 | 10/1955 | Montgomery et al. | 33/178 F |
| 2,931,440 | 4/1960 | Lebourg | 166/241 |
| 3,045,767 | 7/1962 | Klassen | 175/325 X |
| 3,343,890 | 9/1967 | Homer | 166/241 X |
| 3,977,468 | 8/1976 | Brewer et al. | 166/241 |
| 4,040,757 | 8/1977 | Pauli | 403/356 |
| 4,219,081 | 8/1980 | Howe | 166/241 |

Primary Examiner—Stephen J. Novosad
Assistant Examiner—Joseph Falk
Attorney, Agent, or Firm—Richard M. Byron; Patrick H. McCollum

[57] ABSTRACT

An earth borehole instrument having a plurality of contact arms which are forced against the borehole side-walls so as to centralize the instrument in the hole. The contact arms may be either left free to rotate or may be positively locked in a number of non-rotational positions. This locking is done by fixedly engaging an indexing member, which is restricted to movement only in translation as to the instrument shaft, with the contact arms, thereby similarly restricting their movement.

7 Claims, 6 Drawing Figures

BOREHOLE CENTRALIZER WITH POSITIVELY INDEXABLE CONTACT ARMS

BACKGROUND OF THE INVENTION

This invention relates generally to earth borehole apparatus and specifically to apparatus for centralizing well logging and/or completion equipment in the borehole.

Borehole centralizers are often used as a part of a string of well logging instruments traversed in a borehole by means of a cable. These centralizers have a plurality of contact members which are urged against the borehole walls, causing the centralizer body and the associated well logging instrumentation to be centered in the borehole.

Difficulty may occur when these centralizers are used with other borehole contact instruments, such as a caliper. A caliper is a device having a plurality of contact arms which contact the borehole sidewalls and by various means relate signals indicative of the size of the borehole. It is to be understood that when a multi-armed instrument such as a centralizer or caliper traverses an uncased borehole, grooves or tracks in the borehole sidewalls will typically result. When the arms of an instrument such as a caliper are located directly below the arms of a centralizer, the arms of the caliper will track the grooves made by the arms of the centralizer and therefore measure the indention or track in the borehole made by the centralizer arm rather than yielding a true reading of the borehole diameter. Therefore, it is desirable to be able to index or offset the centralizer arms from those of a caliper or similar instrument.

However, where tracking errors are not a problem, for example, as with instruments which do not contact the borehole, it is desirable for the centralizer arms to be able to freely rotate around the centralizer body and hence around the instrument string. This rotation is desirable because (a) it is desirable to allow any natural twist in the support cable to be released and (b) to prevent placing additional twist in the support cable due to the tendency of the centralizer arms to track spirally in the borehole. While it is possible to have a different centralizer for each purpose, it is desirable for reasons of both cost and efficiency to have one centralizer with contact arms capable either of free rotation or of being fixedly offset with relation to whatever other multi-armed instrument is being used.

Prior art in the well logging field has typically relied upon devices such as set screws or compressible collars on the contact arm carriers to secure an offset of arm indexing. These devices depend upon friction to maintin a position and do not provide a positive mechanical lock for the arm position. Therefore, changes in temperature, forces exerted upon the arms while traversing the well, or other borehole conditions could cause the arms to rotate away from their indexed position. Additionally, since the adjusting mechanisms are exposed to the borehole environment, they are subject to corrosion and fouling, thus tending further to decrease their effectiveness.

Accordingly, the present invention overcomes the deficiencies of the prior art by providing a simple mechanical means for providing a positive mechanical lock on the rotation of the contact arms of a borehole centralizer or similar device while also allowing free rotation of such arms when desired.

SUMMARY OF THE INVENTION

A centralizer for use in an earth borehole having an elongated shaft supporting a plurality of contact arms which are forced against the borehole sidewalls and may be either locked in a fixed position or left free to rotate around such shaft. The contact arms are pivotally mounted between two slidable and rotatable members. These members are acted upon by coil springs serving to draw them together, thereby forcing the contact arms out and against the sides of the borehole. The force exerted upon the contact arms is adjustable by a means for varying the state of expansion of the coil springs.

The contact arms may be either left free to rotate or be securely locked in position and restricted to non-rotational movement. These arms are carried between two contact arm carriers, each arm carrier having a radially serrated surface. An indexing member having a complimentarily serrated surface is mated with each arm carrier and placed so projections on the indexing members mate with recesses in the support shaft. When this combination is secured in place the arms are held in intransigent rotational relation.

Accordingly, it is a feature of the present invention to provide a new and improved centralizer for use in earth boreholes.

It is still another feature of the invention to provide a new and improved borehole coentralizer with contact arms which may be indexed throughout a range of positions and positively locked in any of such positions.

DETAILED DESCRIPTION OF THE PREFERRED EMBODIMENT

Figure 1:
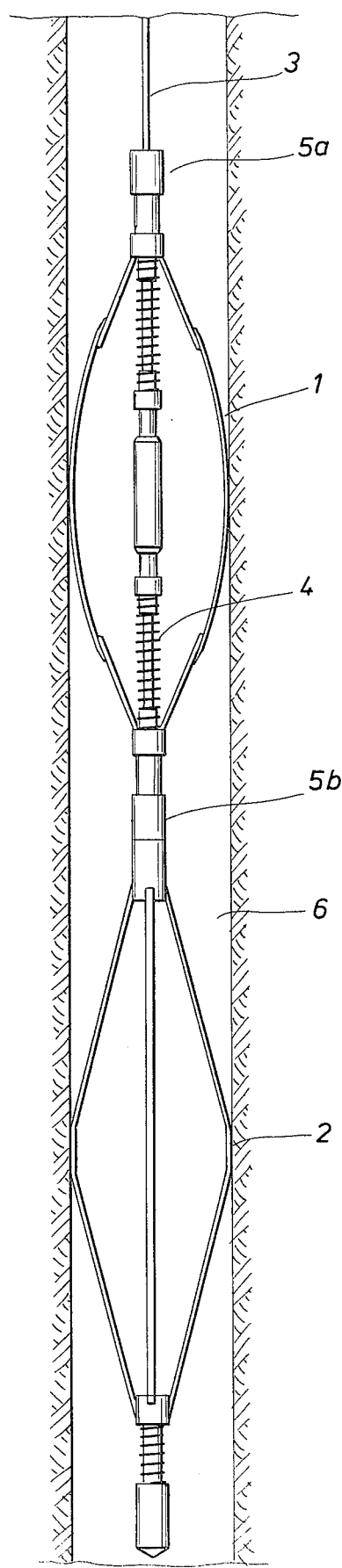
FIG. 1 illustrates the borehole centralizer apparatus of this invention joined to a caliper apparatus suspended in an earth borehole, shown in cross-section.

Referring to FIG. 1, there is illustrated a borehole centralizer 1 affixed to a borehole caliper 2 in a common logging configuration, disposed within an earth borehole 6, shown in cross-section, suspended by a cable 3. The cable 3 would normally be connected to a hoisting unit (not illustrated) at the surface, in a manner well known and conventional in the art.

The borehole centralizer 1 has an elongated shaft 4 with cablehead fittings 5a, 5b threadably connected at each end so as to allow the centralizer to be connected between the cable 3 and a logging instrument 2 as illustrated, or in combination, above or below other logging instruments.

Figure 2A:
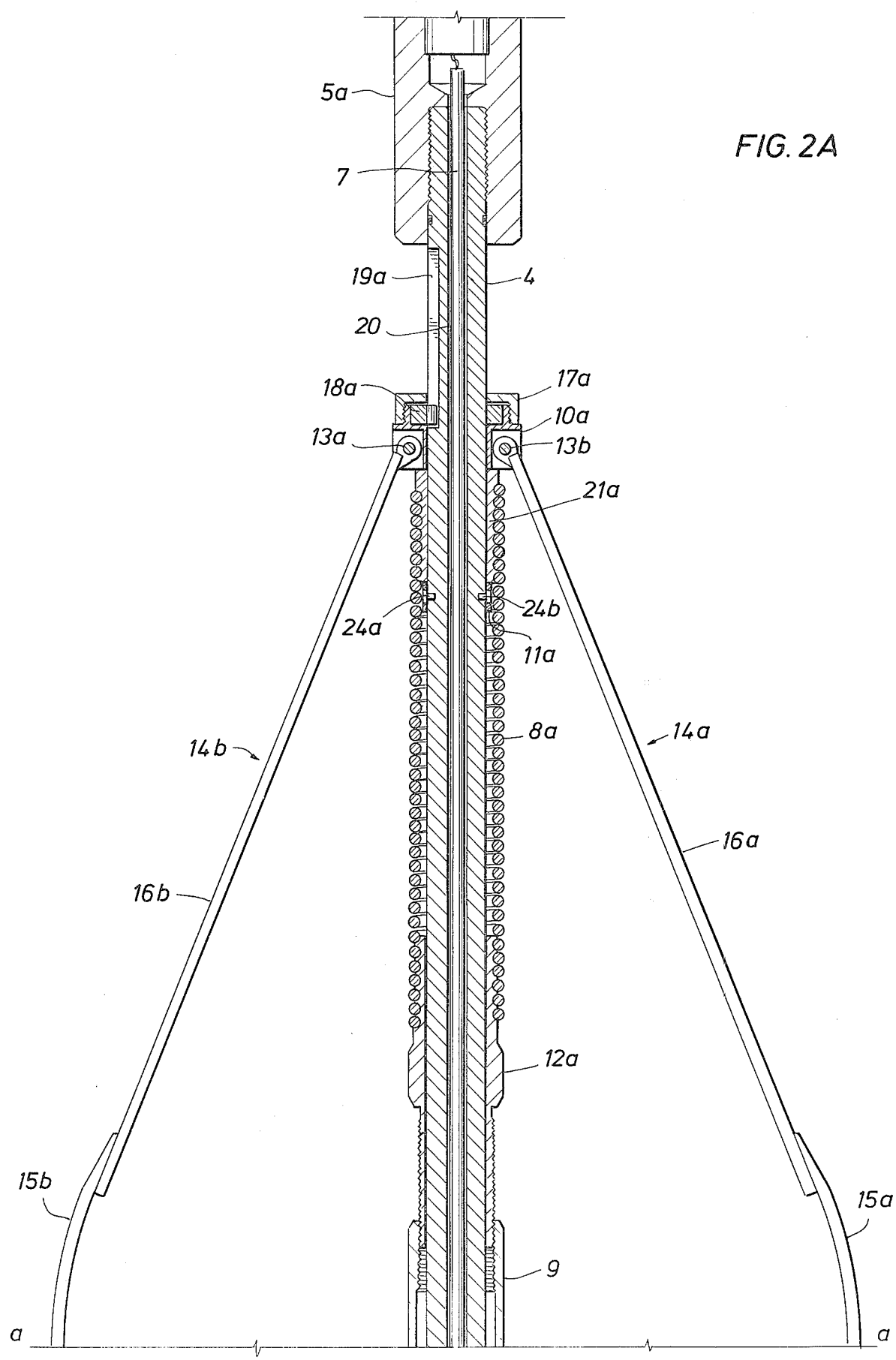
FIGS. 2a–b when joined together at common lines a—a illustrate a cross-sectional view of the centralizer apparatus of this invention.
Figure 2B:
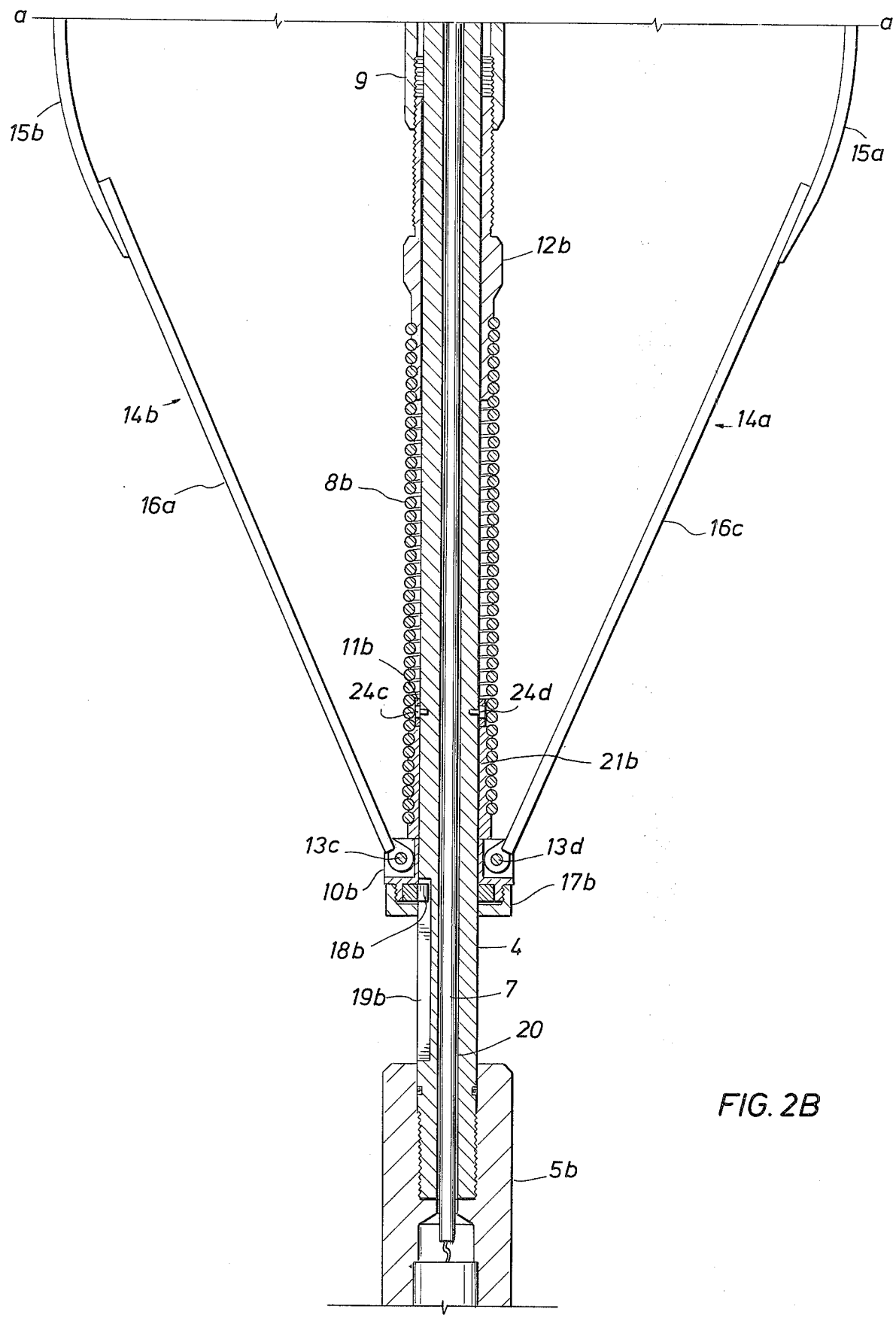

Referring now to FIG. 2, there is shown the borehole centralizer 1 in cross-section. The centralizer is constructed upon a shaft 4 which has a longitudinal aperture 20 therethrough, containing one or more electrical cables 7 or other means for passing electrical signals between the cableheads 5a and 5b at each end of shaft 4.

Disposed towards each end of shaft 4 are contact arm carriers 10a and 10b. Each arm carrier 10a and 10b has a threaded extension 21a and 21b, the threads on such extensions having a full radius equal to that of a cross-section of identical coil springs 8a and 8b. The arm carriers 10a and 10b are slidably and rotatably mounted on shaft 4 with the threaded extensions 21a and 21b facing the center of shaft 4. Located centrally on shaft 4 are two adjusting retainers 12a and 12b. Each adjusting retainer 12a and 12b has a first end threaded in the manner described above to mate with coil springs 8a and 8b. Disposed toward the second end of each adjusting retainer 12a and 12b is an extension having conventional threads. These adjusting retainers 12a and 12b are rotatably and slidably mounted on shaft 4 with the conventionally threaded extensions facing centrally where they are threadably coupled with complimentarily threaded adjusting collar 9. Threadably mated to each pair of arm carriers 10a and 10b and spring retainers 12a and 12b is coil spring 8a or 8b. Coil springs 8a and 8b are threadably mounted in a state of extension causing them to simultaneously exert a force drawing arm carriers 10a and 10b toward the center of shaft 4. Such movement of arm carriers 10 and 10b is limited by stop collars 11a and 11b secured to shaft 4 by bolts 24a, 24b, 24c, and 24d. (Shown in greater detail in FIG. 3.)

A plurality of identical contact arms 14a, 14b are distributed around the radius of shaft 4 and are pivotally connected between arm carriers 10a and 10b by means of pivot pins 13a, 13b, 13c and 13d. While these contact arms may take many forms the preferred embodiment utilizes arms each consisting essentially of a bow spring 15a or 15b interconnected between two rigid arms 16a and 16b or 16c and 16d.

As the centralizer is used in a borehole the force exerted by coil springs 8a and 8b draws arm carriers 10a and 10b toward the center of shaft 4, forcing contact arms 14a and 14b diagonally away from shaft 4 so that bow springs 15a and 15b contact the sides of the borehole. The equal force exerted on the identical contact arms 14a and 14b causes them to apply equal force against the borehole walls, thereby maintaining shaft 4 centralized in the hole. The pressure exerted on the walls of the borehole may be changed to adjust for variances in hole size or sidewall consistency by means of adjusting collar 9. As adjusting collar 9 is rotated clockwise it acts upon adjusting retainers 12a and 12b, drawing them centrally, away from the arm carriers 10a and 10b, increasing the expansion of coil springs 8a and 8b, and thereby increasing the force exerted on contact arms 14a and 14b. A reduction of contact arm pressure is accomplished in the reverse manner from above, by rotating adjusting collar 9 counter-clockwise.

As discussed earlier with respect to the prior art, it is often desirable to secure the contact arms 14a and 14b in a fixed rotative position relative to the shaft and therefore, in turn, to the remainder of the string of logging/completion instruments. The present invention accomplishes this by a positive-locking indexing means.

Figure 3:
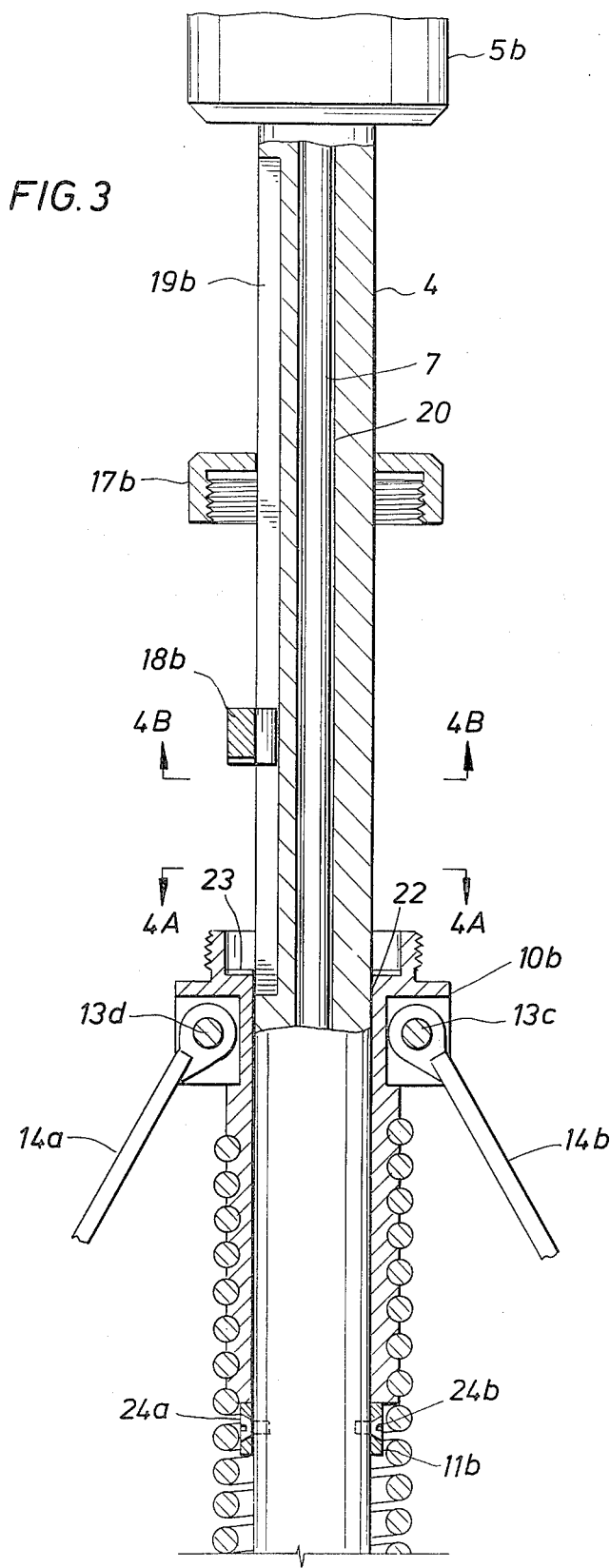
FIG. 3 is a more detailed view of the components of the indexing means of this invention.

Referring now to FIG. 3, there is shown the indexing apparatus of this borehole centralizer in greater detail. Because the indexing apparatus at each end of the centralizer is identical, only one need be described in detail for illustrative purposes. Arm carrier 10b is slidably and rotatably mounted on shaft 4. Shaft 4 has a longitudinal notch or recess 19b throughout the possible range of transitional movement of arm carrier 10b. Arm carrier 10b has a radially serrated inner surface 23 around the periphery of shaft passage 22 (shown in more detail in FIG. 4a). An indexing member 18b is used to hold shaft 4 and arm carrier 10b in intransigent rotational relation. In the preferred embodiment, this indexing member 18b is a half-ring collar with a radially serrated surface complimentary to the serrated surface of arm carrier 10b, and also having a tab or projection on its inner radius, (shown in more detail in FIG. 4b) such tab or projection being matable with the notch or recess 19b in shaft 4.

To prevent rotation of arm carrier 10b about shaft 4, indexing member 18b is placed such that its projection mates with the recess 19b in shaft 4 and its serrations are enmeshed with those of arm carrier 10b. Indexing member 18b is secured in position with locking cap 17b, which is threadably joined to arm carrier 10b, restricting arm carrier 10b and thereby the contact arms 14a and 14b to non-rotational movement. Although indexing means at one end only of the shaft will suffice to prevent rotation of the contact arms 14a and 14b, the preferred embodiment utilizes such means at each end of shaft 4 to minimize stress between the indexing member projection and shaft recess 19b, and to prevent excessive torquing of the contact arms 14a and 14b as the centralizer traverses the borehole.

Figure 4B:
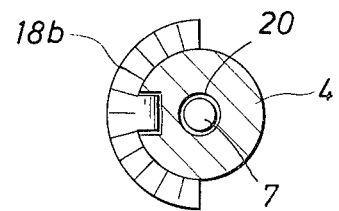
FIGS. 4a–b are a detailed view of the contact arm carrier and the indexing member of the centralizer apparatus of this invention.
Figure 4A:
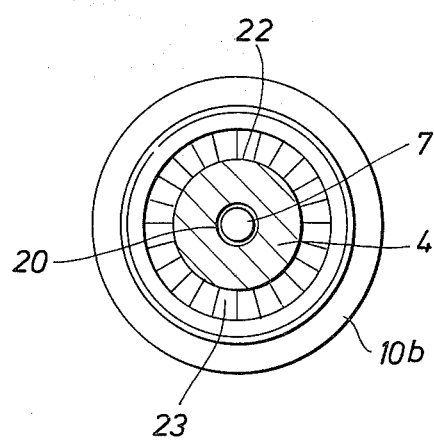

Referring now to FIGS. 4a–b, it can be seen that the possible angles of indexing adjustment are dependent upon the angles of the radial serrations of the arm carrier 10b, illustrated in FIG. 4a, and the indexing member 18b, illustrated in FIG. 4b. The angle of indexing will be approximately equal to the crest to crest tooth angle of these serrations.

Referring again to FIG. 2, for applications in which it is desirable to allow the centralizer contact arms 14a and 14b to freely rotate it is necessary only to loosen locking caps 17a, 17b and remove indexing member 18a and 18b, thus leaving the contact arms 14a and 14b free to rotate about shaft 4. Locking caps 17a and 17b are then replaced and the centralizer is ready for use in the borehole.

Thus it should be appreciated that there has been illustrated and described herein the preferred embodiment of the present invention which finds utility in centralizing well logging and/or completion apparatus in a well while allowing the centralizing means to be either indexed and positively in plurality of positions or freely rotatable so as to optimize the operations being conducted. However, those skilled in the art will recognize that obvious modifications can be made without departing from the spirit of the invention. For example, while the illustrated embodiment shows the use of a half-ring locking member, this could be replaced with a full collar and woodruff key assembly. Additionally, although the preferred embodiment utilizes an arm carrier with an inner serrated surface, the serrations could instead be placed around the circumference of the arm carrier. Furthermore, although not illustrated, those skilled in the art will recognize that such instruments may contain three or four contact arms to better maintain centralization of the instrument in the borehole.

The embodiments of the invention in which an exclusive property or privilege is claimed are defined as follows:

1. An apparatus for centering a well logging instrument in an earth borehole, comprising:
   an elongated shaft adapted for movement through an earth borehole, said shaft having at least one longitudinal recess therein;
   a pair of contact arm carriers slidably and rotatably mounted on said shaft, said carriers having a serrated surface;

a pair of coil springs, each having a first end connected to one of said contact arm carriers;

a pair of adjustable retainers slidably and rotatably mounted on said shaft and attached to the second end of said coil springs;

means for adjusting the force exerted by said coil springs;

a plurality of contact arms, said arms being pivotally connected between said pair of contact arm carriers;

at least one disengagable indexing member having serrations matable with the serrations on at least one of said contact arm carriers, said indexing member also having a projection adapted to mate with said longitudinal recess in said shaft and;

means for securing said locking member, said contact arm carrier and said shaft in relative position to one another.

2. An apparatus for centralizing an instrument within a borehole, comprising:

an elongated shaft member, having a longitudinal slot therein, adapted for movement through a borehole;

at least one concentric carrier member rotationally and longitudinally movable with respect to said shaft member, said carrier member having a radially serrated inner surface;

arms means connected to said at least one carrier member for contacting the sidewall of said borehole; and means for selectively indexing and positively locking said arm means in a selected one of a plurality of fixed rotational positions relative to said shaft member, said means including an insertable indexing member having a radially serrated surface complimentary to that of said carrier member and an extension portion longitudinally slidable within at least a portion of said longitudinal slot in said shaft member.

3. The apparatus of claim 2 further comprising spring means for exerting an expansion force on said arm means.

4. The apparatus of claim 3 further comprising means for adjusting said expansion force exerted on said arm means.

5. An apparatus for centralizing an instrument within a borehole, comprising:

an elongated shaft member having first and second longitudinal recesses located proximate the first and second end thereof, respectively;

first and second slidably and rotatably mounted carrier members concentrically located on said shaft each of said carrier members having a radially serrated surface;

a plurality of arm members bridgingly mounted between said first and second carrier members;

indexing means for allowing said carrier members to be selectively fixed in one of a plurality of positions relative to said shaft said indexing means including;

a first indexing member having a radially serrated surface complimentary to that of said first carrier member and an extension portion slidable within said first longitudinal recess; and a second indexing member having a radially serrated surface complimentary to that of said second carrier member and an extension portion slidable within said second recess.

6. The apparatus of claim 5 further comprising a pair of coil springs, each having an end connected to one of said carrier members for exerting an expansion force on said arm members.

7. The apparatus of claim 6 further comprising means for adjusting the force exerted by said pair of coil springs.

* * * * *